US009646369B2

(12) United States Patent
Salzman et al.

(10) Patent No.: US 9,646,369 B2
(45) Date of Patent: May 9, 2017

(54) CONCEPTS FOR SORTING ITEMS USING A DISPLAY

(71) Applicant: UNITED PARCEL SERVICE OF AMERICA, INC., Atlanta, GA (US)

(72) Inventors: David Ray Salzman, Montville, NJ (US); Paul Augustine Loubriel, Ossining, NY (US); Jonathan Gray, Bridgewater, NJ (US); William D. Hess, Salisbury Mills, NY (US); Devang R. Vaidya, Warren, NJ (US); Carl M. Skonberg, Wyckoff, NJ (US); Scott Alan Loverich, Westwood, NJ (US); Duane Anderson, Midlothian, VA (US)

(73) Assignee: United Parcel Service of America, Inc., Atlanta, GA (US)

( * ) Notice: Subject to any disclaimer, the term of this patent is extended or adjusted under 35 U.S.C. 154(b) by 402 days.

(21) Appl. No.: 14/204,657

(22) Filed: Mar. 11, 2014

(65) Prior Publication Data

US 2015/0262348 A1    Sep. 17, 2015

(51) Int. Cl.
| | | |
|---|---|---|
| H04N 17/00 | (2006.01) | |
| H04N 17/02 | (2006.01) | |
| G06T 7/00 | (2017.01) | |
| G06K 9/20 | (2006.01) | |

(52) U.S. Cl.
CPC .......... *G06T 7/0004* (2013.01); *G06K 9/2063* (2013.01); *G06T 7/004* (2013.01); *G06K 2209/19* (2013.01); *G06T 2207/10016* (2013.01)

(58) Field of Classification Search
CPC ......... G06T 7/00; G06T 7/004; G06T 7/0004; G06T 7/20; G06K 9/18; G06K 9/183; G06K 9/2063; G06K 2209/19; G06K 2207/10016; H04N 7/18
USPC .................................................. 348/180, 184
IPC ........................................... H04N 17/00,17/02
See application file for complete search history.

(56) References Cited

U.S. PATENT DOCUMENTS

| | | | |
|---|---|---|---|
| 6,236,735 B1 | 5/2001 | Bjorner et al. | |
| 7,063,256 B2 | 6/2006 | Anderson et al. | |
| 7,090,134 B2 | 8/2006 | Ramsager | |
| 7,221,276 B2 | 5/2007 | Olsen, III et al. | |
| 7,561,717 B2 * | 7/2009 | Anderson .......... | G06K 17/0022 235/462.13 |
| 8,571,298 B2 | 10/2013 | McQueen et al. | |
| 2005/0119786 A1 | 6/2005 | Kadaba | |
| 2012/0160911 A1 | 6/2012 | Smith et al. | |
| 2013/0048722 A1 | 2/2013 | Davis et al. | |
| 2013/0144429 A1 | 6/2013 | Ragusa et al. | |

* cited by examiner

*Primary Examiner* — Trang U Tran
(74) *Attorney, Agent, or Firm* — Alston & Bird LLP (57) ABSTRACT

Concepts for presenting display features to a user of a system which comprises a display, an acquisition device, and a controller system. In various embodiments, the acquisition device is configured to capture image data of one or more items moving along a conveying mechanism and read item identifiers associated with each item. The system then associates or identifies display features with each item identifier and presents the captured image data with the display features presented on or near the image data of the items.

21 Claims, 6 Drawing Sheets

CONCEPTS FOR SORTING ITEMS USING A DISPLAY

TECHNOLOGICAL FIELD

The following invention generally relates to the field of tracking, handling, and sorting items. More particularly, the present invention provides concepts for providing item information to a user by displaying the information on a visual display.

BACKGROUND

Sending items to a variety of locations around the world typically includes several sorting steps in which items are sorted according to their final destination. Often, these items are sorted one or more times at each of a variety of different sort locations, each sorting step being designed to move the item closer to its final delivery destination. For example, an item may be initially received by a carrier and sorted into one of several groups bound for one of several intermediate sorting hub facilities. The sorted items may be placed on feeder trucks, rail cars, airplanes, or other transportation vehicles and taken to intermediate sort hub facilities, where the group of items may be again sorted into various groups bound for a second sort location. This process may continue until the items are sorted into groups bound for a common final delivery vehicle and then taken to their final delivery destinations.

Modern sorting systems may use a complex system of conveyors, slides, bins, and other devices to sort items according to one or more characteristics of the item. The characteristics used to sort items may be indicated on the item using indicia, such as printed text, symbols, or pictures designating, for example, a final delivery address. Alternatively, sort characteristics may be identified using other means, such as electronic tags readable using electronic readers or scanners.

Although item sorting has been greatly improved through the use of modern technologies such as the mentioned electronic readers and computer-controlled conveyor systems, the sorting process still requires a knowledgeable and attentive labor force to coordinate and track the items during sorting. The sorting environment may be described as dynamic and busy, where personnel experience a constant barrage of various stimuli requiring quick decision-making and physical activity. The sorting personnel may be required to determine an appropriate sorting location for each item that enters the work area and quickly move the item to the appropriate location.

In many existing systems, each intermediate sort step may require separate handling instructions to be printed on a label applied to each item. However, for items requiring multiple intermediate sort steps, continued re-labeling creates a significant cost and adds an additional risk of potential errors in the already complex sorting process.

As illustrated by U.S. Pat. No. 7,090,134, incorporated in its entirety herein, the carrier industry has made previous efforts to reduce the costs and risks of error involved in the intermediate sort steps by projecting sort instructions directly onto items moving along a conveyor belt. However, there exists a continuing need for alternative means for providing clear instructions to item sorting personnel working in a variety of environments each having a different configuration.

BRIEF SUMMARY

In various embodiments, the present invention may include a system for processing one or more items moving along a path comprising an acquisition device, a controller system, and a display, the system configured to: (1) capture image data of an item moving along the path and an item identifier associated with the item; (2) identify a display feature based at least in part on the item identifier, and associate the item identifier with the image data; and (3) present the image data and the associated display features. In various embodiments, the display feature may include a handling instruction. In various embodiments the system is additionally configured to determine a location of the item moving along the path, and may determine the location of the item at multiple instances in time while the item is located within the acquisition zone. The system may be configured to present the associated display features on or near the determined locations of the one or more items in the image data. In various embodiments the system may be configured to present the image data after a delay, such as a delay determined based on the speed at which the items are moving and the distance between a point in the acquisition zone and a corresponding point in a work zone. In various embodiments, the delay may be value indicating an amount of time received by the system as input.

In various embodiments, the present invention may include a method for processing items moving along a path, comprising steps for: (1) capturing image data of an item moving along a path; (2) receiving an item identifier for the item; (3) identifying a display feature based at least in part on the item identifier; (4) associating the display feature with the item identifier and the image data; and (5) displaying the image data and the associated display features. In various embodiments, the display features may comprise at least one handling instruction. The method may, in various embodiments, comprise the additional step of determining a location of the item moving along the path, and may additionally include the step of determining the location of the item at multiple instances in time while the item is located within an acquisition zone. The method may additionally include the step of associating the display features with the determined locations of the item and may include the step of displaying the image data with the display features located on or near the determined locations of the item. In various embodiments, the displaying step may be accomplished after a time delay, such as the amount of time for the item to move from an acquisition zone to a work zone, determined based on the speed at which the items are moving and the distance between a point in the acquisition zone and a corresponding point in a work zone. In various embodiments, the period of time may be an amount received as input from a user.

In various embodiments, the present invention may include a computer program product comprising at least one non-transitory computer-readable storage medium having computer-readable program code portions stored therein, the computer-readable program code portions comprising executable portions configured to: (1) receive image data of an item moving along a path; (2) receive an item identifier for the item; (3) identify a display feature based at least in part on the item identifier; (4) associate the display feature with the item identifier and the image data; and (5) display the image data and the associated display features. In various embodiments, the display features may comprise at least one handling instruction. The computer program product may, in various embodiments, comprise an additional executable portion configured to determine a location of the item moving along the path, and may additionally include executable portions configured to determine the location of the item at multiple instances in time while the item is located within an acquisition zone. The computer program product may additionally include executable portions configured to associate the display features with the determined locations of the item and to display the image data with the display features located on or near the determined locations of the item. In various embodiments, the computer program product may be configured to display the image data after a time delay, such as the amount of time for the item to move from an acquisition zone to a work zone, determined based on the speed at which the items are moving and the distance between a point in the acquisition zone and a corresponding point in a work zone. In various embodiments, the period of time may be an amount received as input from a user.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Overview

Various embodiments of the present invention relate to concepts for displaying item information to a user. An exemplary system may comprise an acquisition device, one or more displays, and one or more controller systems. The system may be implemented in conjunction with an item conveying mechanism such as a conveyor belt. In various embodiments, the acquisition device may be configured to capture images of items moving along a conveying mechanism, track the location of each item as it moves across an acquisition zone, and capture an item identifier associated with each item. The system may utilize a controller system to determine appropriate sort instructions for each item moving along the conveying mechanism based on one or more item characteristics, such as the final destination of each item. The controller system may then associate the sort instructions with the tracked item location in the captured images. The system may then determine when each item enters a user's work area, and display the captured images with item information overlaid on or near the determined item location. The system may utilize information regarding the speed at which the items and/or conveying mechanism is moving and the location of the work zone in relation to the acquisition area in determining an appropriate delay period before displaying the image data.

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

Figure 1:
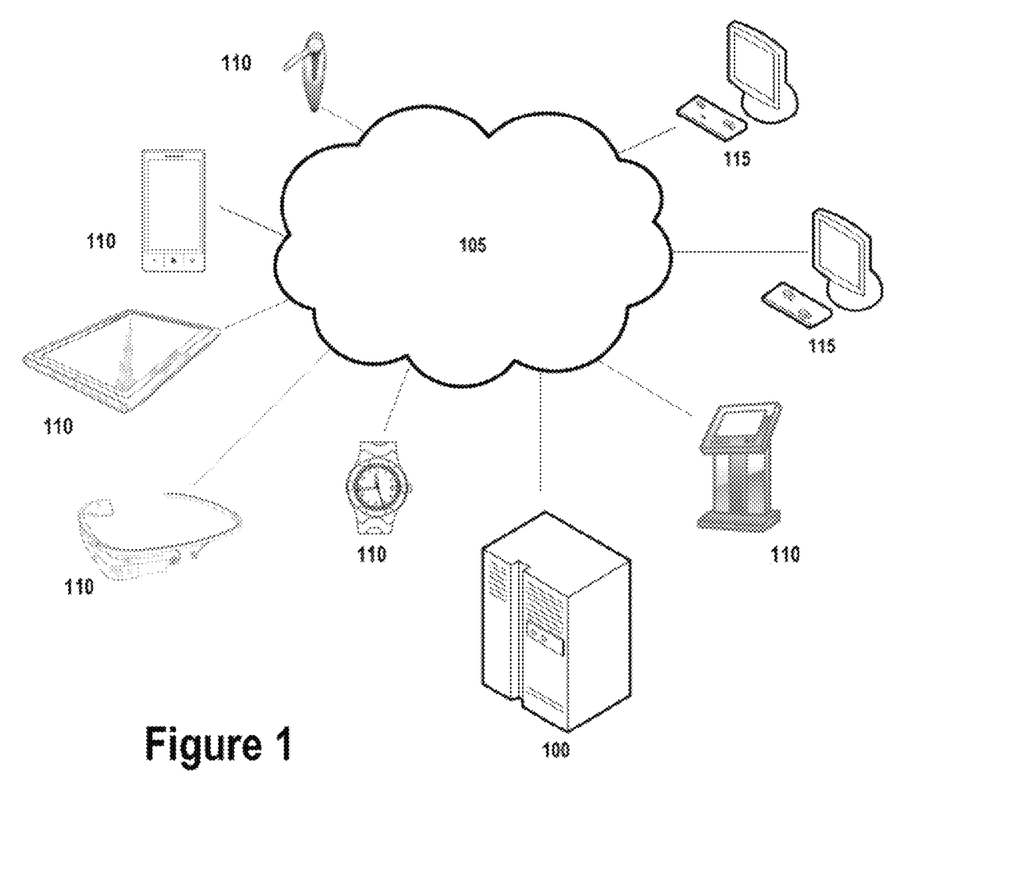
FIG. 1 is an overview of a system that can be used to practice embodiments of the present invention.

Generally, embodiments of the present invention relate to concepts for providing information regarding one or more items moving along a conveying mechanism. For example, embodiments of the present invention may be used for processing singulated or non-singulated items. FIG. 1 is a schematic diagram showing the exemplary communication relationships between components of various embodiments of the present invention. As shown in FIG. 1, the system may include one or more controller systems 100, one or more user devices 110, one or more display entities 115, and one or more networks 105. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

A. Exemplary Controller System

Figure 2:
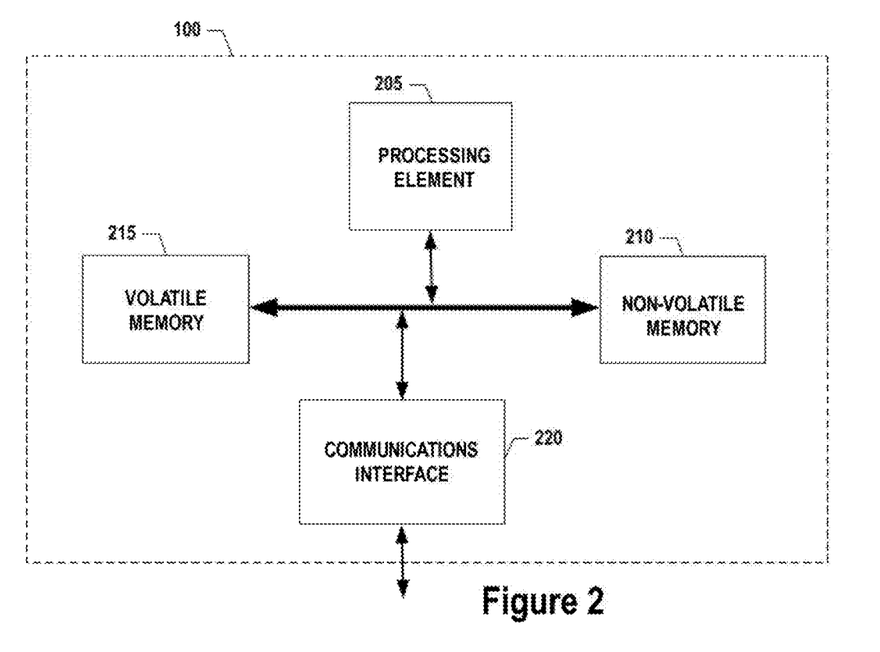
FIG. 2 is an exemplary schematic diagram of a controller system according to one embodiment of the present invention.

FIG. 2 provides a schematic of a controller system 100 according to one embodiment of the present invention. As described above, the controller system 100 may be incorporated into a system as one or more components for providing information regarding one or more items moving along a conveying mechanism. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The controller system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the controller system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the controller system 100 may include or be in communication with one or more processing elements 205 (also referred to as processors, processing circuitry, and/or similar terms used herein interchangeably) that communicate with other elements within the controller system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the controller system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, an acquisition module, a sort location module, and a matching module. The terms database, database instance, database management system, and/or similar terms used herein interchangeably may refer to a structured collection of records or data that is stored in a computer-readable storage medium, such as via a relational database, hierarchical database, and/or network database.

In one embodiment, the controller system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the controller system 100 with the assistance of the processing element 205 and operating system.

As indicated, in one embodiment, the controller system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the controller system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth™ protocols, wireless universal serial bus (USB) protocols, and/or any other wireless protocol.

Although not shown, the controller system 100 may include or be in communication with one or more input elements, such as a keyboard input, a mouse input, a touch screen/display input, motion input, movement input, audio input, pointing device input, joystick input, keypad input, and/or the like. The controller system 100 may also include or be in communication with one or more output elements (not shown), such as audio output, video output, screen/display output, motion output, movement output, and/or the like.

As will be appreciated, one or more of the controller system's 100 components may be located remotely from other controller system 100 components, such as in a distributed system. Furthermore, one or more of the components may be combined and additional components performing functions described herein may be included in the controller system 100. Thus, the controller system 100 can be adapted to accommodate a variety of needs and circumstances. As will be recognized, these architectures and descriptions are provided for exemplary purposes only and are not limiting to the various embodiments.

B. Exemplary User Device

Figure 3:
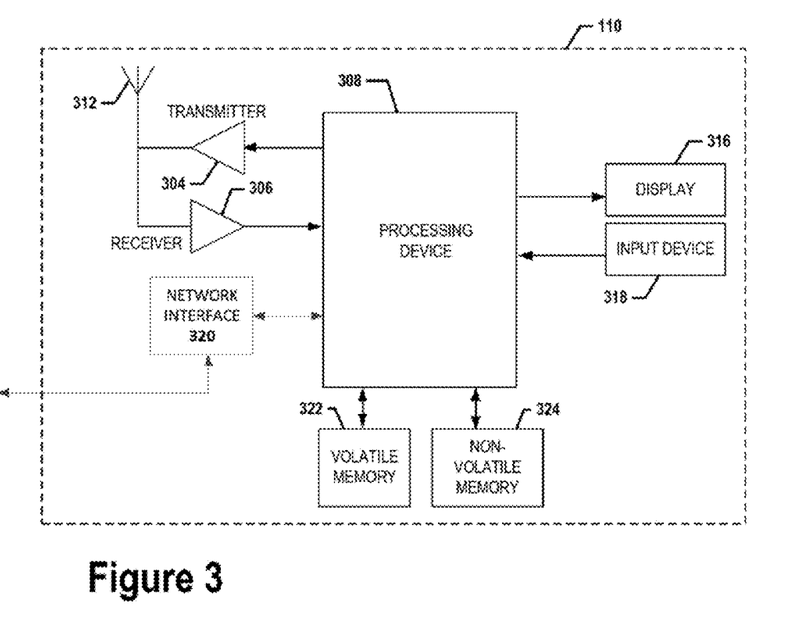
FIG. 3 is an exemplary schematic diagram of a user device according to one embodiment of the present invention.

A user may be an individual, group of individuals, and/or the like. In various embodiments, a user may operate a user device 110 that includes one or more components that are functionally similar to those of the controller system 100. FIG. 3 provides a schematic of a user device 110 according to one embodiment of the present invention. As noted above in referencing the controller system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the user device 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the controller system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™, USB, and/or the like. Similarly, the user device 110 may operate in accordance with multiple wired communication standards and protocols, such as those described above with regard to the controller system 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include a location determining aspect, device, module, functionality, and/or similar words used herein interchangeably. For example, the user device 110 may include outdoor positioning aspects, such as a location module adapted to acquire, for example, latitude, longitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information may be determined by triangulating the user device 110's position in connection with a variety of other systems, including cellular towers, Wi-Fi access points, and/or the like. Similarly, the user device 110 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user device 110 may also comprise a user interface (that can include a display 316 coupled to a processing element 308 and/or a user input device 318 coupled to a processing element 308). For example, the user interface may be a user application, browser, user interface, and/or similar words used herein interchangeably executing on and/or accessible via the user device 110 to interact with and/or cause display of information from the controller system 100, as described herein. The user input interface can comprise any of a number of devices allowing the user device 110 to receive data, such as a keypad (hard or soft), a touch display, voice or motion interfaces, or other input device. In embodiments including a keypad, the keypad can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the controller system 100, acquisition/display entity 115, and/or various other computing entities.

In another embodiment, the user device 110 may include one or more components or functionality that are the same or similar to those of the controller system 100, as described in greater detail above. As will be recognized, these architectures and descriptions are provided for exemplary purposes only and are not limiting to the various embodiments.

C. Exemplary Acquisition/Display Entity

Figure 4:
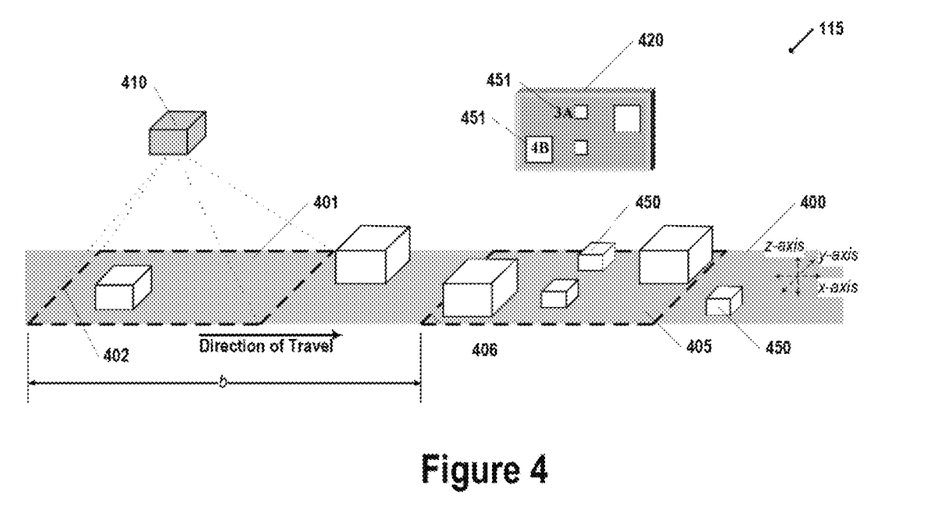
FIG. 4 is an exemplary conveyor system with integrated acquisition/display entity according to one embodiment of the present invention.

FIG. 4 includes an illustration of an acquisition/display entity 115 according to one embodiment of the present invention. As shown in FIG. 4, the acquisition/display entity 115 may comprise one or more acquisition devices 410 for acquiring information/data from an item 450. In one embodiment, an item 450 may be one or more packages, parcels, bags, containers, loads, crates, items banded together, vehicle parts, pallets, drums, the like, and/or similar words used herein interchangeably. In one embodiment, each item 450 may include an item/shipment identifier, such as an alphanumeric identifier. Such item/shipment identifiers may be represented as text, barcodes, Aztec Codes, Maxi- Codes, Data Matrices, Quick Response (QR) Codes, electronic representations, tags, character strings, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein. As shown, the one or more acquisition devices 410 may be capable of acquiring data (including item/shipment identifiers) for one or more acquisition zones 401 positioned in front of one or more work zones 405. Thus, an item traveling on a conveying mechanism 400 (e.g., conveyor belt, slide, chute, bottle conveyor, open or enclosed track conveyor, I-beam conveyor, cleated conveyor, and/or the like) can pass through an acquisition zone 401 prior to entering a work zone 405. However, as will be understood by one skilled in the art, the acquisition zone 401 may at least partially overlap the work zone 405 such that an item 450 may reside in both the acquisition zone 401 and work zone 405 simultaneously. In various embodiments, the acquisition zone 401 and work zone 405 may be substantially the same size and shape. However, as will be understood by one skilled in the art, the acquisition zone 401 and work zone 405 may be of different sizes and/or shapes. In various embodiments, the acquisition device 410 can be positioned substantially above the conveying mechanism 400. However, the acquisition device 410 may be located at any other position in relation to the conveying mechanism 400, such as substantially above and adjacent to an edge of the conveying mechanism 400.

In certain embodiments, the acquisition device 410 may include or be associated with one or more imaging devices configured to capture images (e.g., image data) of items 450 (and/or item/shipment identifiers) moving along the conveying mechanism 400. For example, the acquisition device 410 may include or be associated with a video camera, camcorder, still camera, web camera, Single-Lens Reflex (SLR) camera, high-speed camera, and/or the like. In various embodiments, the acquisition device 410 may be configured to record high-resolution image data (e.g., images comprising at least 480 horizontal scan lines) and/or to capture image data at a high speed (e.g., utilizing a frame rate of at least 60 frames per second). Alternatively, the acquisition device 410 may be configured to record low-resolution image data (e.g., images comprising less than 480 horizontal scan lines) and/or to capture image data at a low speed (e.g., utilizing a frame rate less than 60 frames per second). As will be understood by those skilled in the art, the acquisition device 410 may be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second). In various embodiments, the acquisition device 410 may be configured to capture image data of the items 450 and conveying mechanism 400 of sufficient quality that a user viewing the image data on the display 420 can identify each item 450 represented in the displayed image data. For example, in embodiments wherein the conveying mechanism 400 and items 450 are moving at a high rate of speed, the acquisition device 410 may be configured to capture image data at a high speed. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest, codes, item/shipment identifiers, and/or the like) can be extracted from the image data.

The acquisition device 410 may additionally include or be associated with one or more scanners, readers, interrogators, and similar words used herein interchangeably configured for capturing item indicia for each item 450 (e.g., including item/shipment identifiers). For example, the scanners may include a barcode scanner, an RFID reader, and/or the like configured to recognize and identify item/shipment identifiers associated with each item 450. In one embodiment, the acquisition device 410 may be capable of receiving visible light, infrared light, radio transmissions, and other transmissions capable of transmitting information to the acquisition device 410. Similarly, the acquisition device 410 may include or be used in association with various lighting, such as light emitting diodes (LEDs), Infrared lights, array lights, strobe lights, and/or other lighting mechanisms to sufficiently illuminate the zones of interest to capture image data for analysis.

In various embodiments, information associated with items can be presented via a display 420. The display 420 may take a variety of forms, such as a Liquid Crystal Display (LCD), a Liquid Crystal on Silicon (LCoS) display, an Active Matrix Organic Light-Emitting Diode (AMOLED) display, a Digital Light Processing (DLP) display, a plasma display, a Cathode Ray Tube (CRT) display, a projected laser, an electronic ink display, and/or the like. The display 420 may be configured for direct viewing, rear projection onto a surface, or front projection onto a surface. The display 420 may be fixed in a particular location, it may be movable to various locations, or it may be wearable by a user. In various embodiments, the display 420 may display images using a black-and-white display, a grey-scale display, and/or a color display. The displayed information may be correlated to the specific items 450, or may be general information unrelated to the specific items 450. The displayed information, for instance, may be in the form of sorting instructions informing a user located near the work zone 405 how each item 450 should be processed or handled, the source of an item 450, and/or the like. Alternatively, the displayed information may comprise information regarding the volume of items 450 on the conveying mechanism, or information regarding upcoming scheduled user breaks (e.g., a lunch break). As will be recognized, a variety of other approaches and techniques can be used to adapt to various needs and circumstances. Similar to the controller system 100 described above, in one embodiment, the acquisition/display entity 115 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the acquisition/display entity 115 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, NFC protocols, Bluetooth™ protocols, wireless USB protocols, and/or any other wireless protocol.

As will be understood by those skilled in the art, the system may include more than one acquisition device 410 and/or display 420. In various embodiments, one or more additional acquisition devices may be used to capture additional image data at one or more additional acquisition zones located on the conveying mechanism 400 or an additional conveying mechanism. Such additional acquisition devices may be located, for example, after the flow of items along the conveying mechanism 400 is disturbed (e.g., the flow of items 450 is culled, merged with an additional flow of items 450, or diverted to an additional conveying mechanism). Alternatively, one or more additional acquisition devices may be located along the conveying mechanism 400 after the work zone 405, such that the one or more additional acquisition devices may capture updated image data after one or more of the items 450 may have been removed from the conveying mechanism 400. In various embodiments, the one or more additional acquisition devices may include components substantially similar to the acquisition device 410. For example, the one or more additional acquisition devices may include or be associated with one or more imaging devices and one or more scanners, readers, interrogators, and similar words used herein interchangeably, as described above in regards to the acquisition device 410. However, the one or more additional acquisition devices may include fewer components than acquisition device 410. For example, the one or more additional acquisition devices may not include a scanner, reader, interrogator, or similar words used herein, and may be configured to receive item identifiers from the acquisition device 410.

In various embodiments, one or more additional displays may be located such that they are visible from one or more additional work zones (e.g., an additional work zone located on the conveying mechanism after the work zone 405). The one or more additional displays may be substantially similar to the display 420. For example, the one or more additional displays may be configured to display image data to an additional user sorting items at an additional sorting location. The one or more additional displays may be configured to display the image data captured by the acquisition device 410, or may be configured to present the updated image data captured by one or more additional acquisition devices.

IV. Exemplary System Operation

Figure 5:
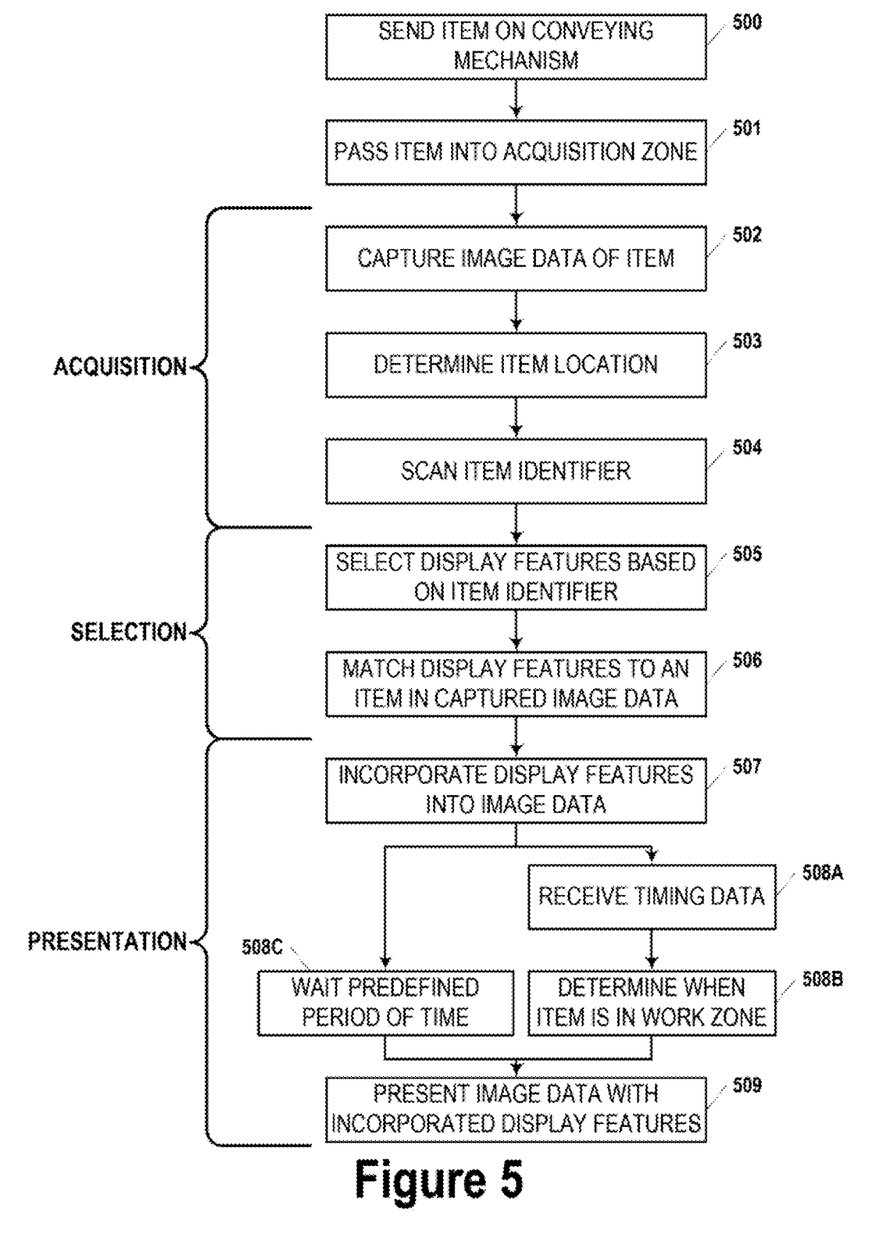
FIG. 5 is a flowchart showing the steps involved in displaying sort information.
Figure 6A:
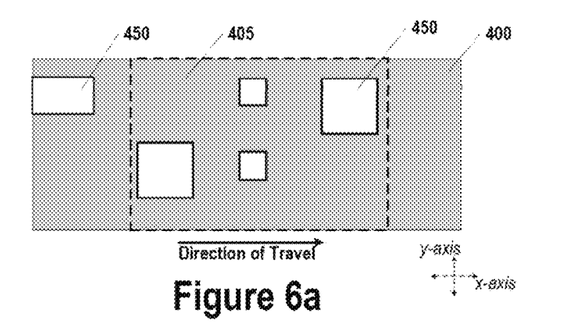
FIGS. 6a and 6b detail an exemplary work zone and display according to one embodiment of the present invention.
Figure 6B:
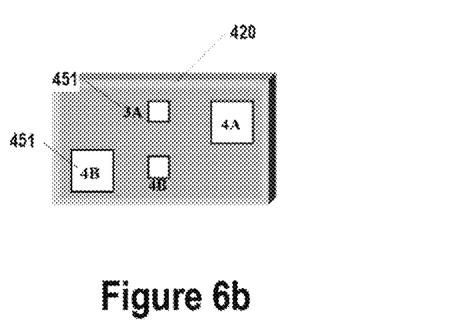
Figure 7A:
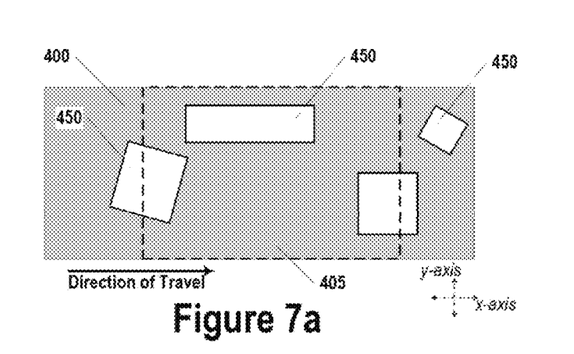
FIGS. 7a and 7b detail an exemplary work zone and display according to one embodiment of the present invention.
Figure 7B:
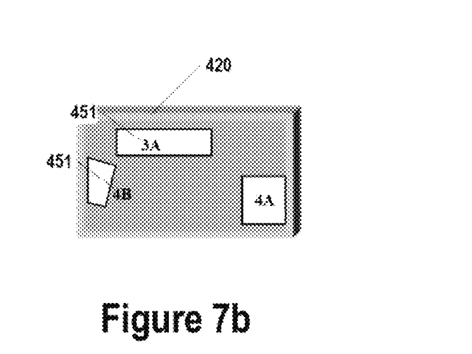

Reference will now be made to FIGS. 5, 6a, 6b, 7a, and 7b. FIG. 5 is a flowchart illustrating operations and processes that may be performed. FIGS. 6a and 6b detail an exemplary work zone and display according to one embodiment of the present invention, and FIGS. 7a and 7b show an exemplary work zone and display according to one embodiment of the present invention. Embodiments of the present invention may be configured to accomplish exemplary tasks, steps, processes, operations, and similar words used herein interchangeably shown in the flowchart of FIG. 5 for a single item 450 of interest: acquisition, selection, and presentation. Various embodiments may be configured to accomplish the general tasks shown in FIG. 5 for multiple items 450 simultaneously. Thus, the acquisition, matching, and presentation tasks may be accomplished for various items 450 in a flow of singulated or non-singulated items 450.

A. Acquisition

As shown in FIG. 5, the process may begin when the conveying mechanism 400 receives an item to be sorted (Block 500 of FIG. 5). The conveying mechanism 400 may receive the item 450 from a variety of sources, such as one or more additional conveying mechanisms. As the item 450 moves with the conveying mechanism 400, the item 450 passes over an upstream edge 402 of an acquisition zone and into the acquisition zone 401 (Block 501) in which the acquisition device 410 may perform the various tasks involved in acquiring information about the item 450. For example, the acquisition device 410 may be configured to capture image data of items 450 passing through the acquisition zone 401 (Block 502 of FIG. 5). The image data may be captured by one or more imaging devices. In various embodiments, the acquisition device 410 may be configured to collect information regarding one or more characteristics of each item 450. The collected characteristics may comprise the appearance of each item 450 (e.g., the color of the item 450, the location of any markings, labels, stickers, and/or the like on the item 450, the shape of the item 450, the size of the item 450, and/or the like), the placement of each item 450 (e.g., the angle between one or more sides of the item 450 and an edge of the conveying mechanism 450), the location of each item 450 in relation to other items 450 or one or more markings, indicators, and/or the like on the conveying mechanism 400, and/or the like.

The acquisition device 410 (or other appropriate computing entity) may determine the location of the one or more items 450 for which image data has been captured (Block 503 of FIG. 5). In various embodiments, the acquisition device 410 (or other appropriate computing entity), may determine the location of each item 450 based at least in part on the collected information regarding one or more characteristics of each item 450. In various embodiments, the acquisition device 410 and/or controller system 100 may be configured to determine a volume of items 450 located in an area on the conveying mechanism 400 based at least in part on the location of each item 450 in relation to other items 450.

In various embodiments, the location of the each item 450 may be determined using location data sufficient to identify the location of each item 450 on the conveying mechanism 400 (e.g., x- and y-coordinates only). However, in other embodiments, the acquisition device 410 may be configured to determine the location of each item 450 in all three dimensions (x-, y-, and z-coordinates). In certain embodiments, the acquisition device 410 or controller system 100 may associate the unique item identifiers with the determined locations of the corresponding items 450. As will be understood by one skilled in the art, the acquisition device 410 or controller system 100 may be configured to determine the location of each item 450 by identifying the location of the unique item identifier associated with each item 450. In various embodiments, the controller system 100 may be configured to associate the unique item identifiers with the collected information regarding the one or more characteristics of each item 450. For example, the controller system 100 may associate a particular unique item identifier with an item 450 having a particular size, shape, and/or location in relation to other items 450.

In another embodiment, the acquisition device 410 may be further configured to determine the location of each item 450 or each unique item identifier at multiple, discrete points in time as the items 450 move across the acquisition zone 401. In this embodiment, the controller system 100 may also associate the unique item identifiers with the determined location of each item 450. Alternatively, the acquisition device 410 may be configured to track the location of each item 450 or each unique item identifier as it moves across the acquisition zone 401 and associate the unique item identifiers with the corresponding items 450 being tracked.

In one embodiment, the acquisition device 410 may be configured to measure the dimensions of each item 450 and its orientation relative to known coordinates. The data gathered for all the items 450 by the acquisition device 410 may be transmitted to the controller system 100 for processing and/or later retrieval.

In one embodiment, to associate the unique item identifiers with item locations (and/or for other reasons, such as to access sortation instructions), the acquisition device 410 may be configured to acquire, capture, scan or otherwise read the unique item identifiers associated with each item 450 (Block 504 of FIG. 5). As indicated, each item 450 may include a unique item identifier that may be used to differentiate the items 450. As described, the unique item identifiers may be represented as text, barcodes, Aztec Codes, MaxiCodes, Data Matrices, QR Codes, electronic representations, tags, character strings, and/or the like. The unique item identifiers read by the acquisition device 410 may be transmitted to the controller system 100. As will be recognized, the unique item identifiers may also be extracted from the image data captured by the imaging devices. Although shown as being accomplished in a particular order in FIG. 5, the tasks represented by Blocks 502, 503, and 504 may be performed in any order and/or simultaneously. In particular, the acquisition device 410 may be configured to continuously capture image data of the conveying mechanism 400 regardless of whether an item 450 is present in the acquisition zone 401. In various embodiments, the acquisition device 410 (or other appropriate computing entity) may be configured to first determine the location of each item 450 on the conveying mechanism 400, and after determining the location of the item 450, read the item indicia related to each located item 450.

B. Selection

Once the acquisition device 410 has acquired item identification information (e.g., unique item identifiers) from items 450, the controller system 100 may receive, process, and store the same. In one embodiment, the item identification information (e.g., unique item identifiers) may be used (e.g., processed) to access sortation instructions or other information (also referred to herein as display features 451), for example, that can be displayed. Thus, the display features 451 can be correlated to the indicia (e.g., unique item identifier) associated with each item 450. When multiple items 450 are being processed together, the controller system 100 can correlate the indicia (e.g., unique item identifiers) acquired from each item 450 and select, determine, retrieve, identify, and similar words used herein interchangeably one or more display features 451 for each item 450 to be displayed. Alternatively, the controller system 100 may be configured to determine one or more display features 451 for only a portion of the items 450 on the conveying mechanism 400. For example, the controller system 100 may determine one or more display features 451 for only those items 450 originating from a particular source (e.g., a specified additional conveying mechanism).

In various embodiments, the controller system 100 may also receive general information related to a work shift for a user (e.g., personnel sorting items) or related to the volume of items 450 on the conveying mechanism 400. For example, the controller system 100 may receive information regarding the scheduled start time of a work shift, the scheduled end time of a work shift, the scheduled start time of one or more breaks occurring during a work shift, the scheduled end time of one or more breaks occurring during a work shift, and/or the like. In various embodiments, the controller system 100 may be configured to incorporate the general information into one or more display features 451 associated with one or more items 451. Alternatively, the controller system 100 may be configured to present the general information such that the general information is not associated with an item 450. In various embodiments, the controller system 100 may be configured to present the general information such that the general information is superimposed on the captured image data before, after, or between one or more items 450.

In various embodiments, a display feature 451 can be determined or identified, for example, based upon the indicia (e.g., unique item identifiers) acquired from each item 450 (Block 505 of FIG. 5). For instance, the appropriate entity of the system can select an appropriate display feature 451 for the item 450 being processed. The display features 451 may also include a handling instruction correlated to or specifically tailored for an item 450. For example, the display features 451 may specify a particular delivery vehicle in which the corresponding item 450 should be placed, and a particular location within the specified delivery vehicle where the corresponding item 450 should be placed. The process of selecting or matching one or more display features with the indicia (e.g., unique item identifiers) may be accomplished by the controller system 100 (or other appropriate computing entities).

In one embodiment, the display features 451 may include text, numerals, symbols, icons, arrows, or combinations thereof designed to convey a message or handling instruction to a user (e.g., to personnel sorting items on the conveyor mechanism 400). The display features 451 may include one or many colors. The display features 451 may be minimal to convey simple instructions, or more complex and involved to convey complex or multiple instructions. For example, a display feature 451 may include a handling instruction in the form of an abbreviation such as "3A" to instruct the user to place an item 450 on a particular conveyor or shelf. In various embodiments, visual characteristics of each display feature 451 (e.g., the size, font, color, shape, and/or the like) may be utilized to convey additional information to a user (e.g., personnel sorting items). For example, a display feature 451 associated with an item 450 may grow larger as the item 450 approaches a specified point in the work zone 405 (e.g., the center of the work zone 405, or the location in the work zone 405 nearest the user). As an additional example, the color of a display feature 451 may indicate the source of an item 450, such that the display feature 451 associated with an item 450 transferred from a first location to the conveying mechanism 400 is displayed in a first color, and the display feature 451 associated with an item 450 transferred from a second location to the conveying mechanism 400 is displayed in a second color.

Embodiments of the present invention may include a standard set of displays or symbols. The display features 451 selected may include one from the standard set. The standard set may include symbols or icons developed to convey special circumstances, from fault messages to special handling instructions. For example, a symbol indicating a failure to read the indicia (e.g., unique item identifier) on the item label may be used to inform the user that a unique item identifier was not properly read. Other symbols may be developed to indicate to the user to manually process an item 450, for example, to carry an item 450 by hand to a special handling location. The various symbols designed may be added to a standard set of display features. In certain embodiments, the controller system 100 and/or display 420 is capable of processing and displaying display features 451 in the form of a variety of icons in different shapes, sizes, and colors, in order to convey information to the user (e.g., personnel sorting items) using symbols.

The controller system 100 may be configured to select and associate a display feature 451 with a particular item 450 displayed in the image data captured by the acquisition device 410 (Block 506 of FIG. 5). In various embodiments, the acquisition device 410 and/or controller system 100 may be configured to record the location of each item 450 at several discrete times while the item 450 is in the acquisition zone 401, such that the controller system 100 can match a particular portion of the captured image data with the corresponding item 450 and can determine an appropriate position in the captured image data at which to superimpose the display features 451 selected for each item 450. Alternatively, the acquisition device 410 or controller system 100 may be configured to determine the location of each represented item 450 or each unique item identifier in the captured image data, such that the controller system 100 can determine an appropriate position in the captured image data at which to superimpose the display features 451 selected for each item 450. As previously described, the acquisition device 410 or controller system 100 may be configured to determine the location of each item 450 based on one or more characteristics of each item 450. The controller system 100 may additionally be configured to associate the one or more display features 451 selected for an item 450 with the corresponding portions of the captured image data (e.g., video).

In various embodiments, the controller system 100 may additionally be configured to associate a display feature 451 or other visual feature comprising general information with a particular location in the captured image data. The controller system 100 may be configured to select a location at which to display the display feature 451 or other visual feature comprising general information based at least in part on the content of the general information. For example, the controller system 100 may be configured to place a display feature 451 or other visual feature comprising general information at a location in the image data (e.g., video) at which no items 450 are displayed, such that the general information appears superimposed on the conveying mechanism 400 after, before, or between items 450. In various embodiments, the controller system 100 may be configured to associate the display feature 451 or other visual feature comprising general information with a characteristic of the conveying mechanism 400, such as the location of a marking, indicator, and/or the like on the conveying mechanism 400. The controller system 100 may be configured to place one or more display features 451 or other visual features comprising general information at a location in the image data such that the display features 451 or other visual features comprising general information appear a predetermined distance away from the nearest item 450. In various embodiments, the controller system 100 may be configured to select a location at which to place the display feature 451 or other visual feature comprising general information such that the display feature 451 or other visual feature comprising general information will be presented via the display 420 within a predetermined amount of time prior to the occurrence of an event. For example, in determining an appropriate location in the image data at which to present a display feature 451 or other visual feature comprising information regarding the end of a work shift, the controller system 100 may be configured to select a display location such that the display feature 451 or other visual feature will be presented via the display 420 no more than a predetermined amount of time prior to the end of the work shift. As an additional example, the controller system 100 may be configured to select a location in the image data at which to place a display feature 451 or other visual feature comprising information regarding an increased volume of items 450 such that the display feature 451 or other visual feature will be presented via the display 420 no more than a predetermined amount of time prior to the increased volume of items 450 enters the work zone 405.

As will be understood by one skilled in the art, the controller system 100 may be configured to update the location of the display feature 451 or other visual feature comprising general information at several discrete times such that the display feature or other visual feature appears to move with the conveying mechanism 400. For example, the controller system 100 may be configured to display a visual feature comprising information regarding the scheduled end of a work shift such that the visual feature appears a predetermined distance away from an item 450. As will be understood by one skilled in the art, the controller system 100 may not be configured to update the location of the display feature 451 or other visual feature comprising general information such that the display feature 451 or other visual feature comprising general information may remain in one location in the image data. Alternatively, the controller system 100 may be configured to incorporate the general information into the display feature 451 associated with an item 450.

C. Presentation

In various embodiments, the display 420 may be positioned such that a user (e.g., personnel sorting items) working near a work zone 405 can view the image data presented via the display 420 from the user's work location (e.g., proximate the conveying mechanism 400). The image data shown via the display 420 may include the image data of the items 450 passing through the acquisition zone 401 captured by the acquisition device 410 (e.g., video of the items) with the one or more display features 451 selected for each item 450 superimposed thereon and/or display features 451 or other visual features comprising general information. In various embodiments, the image data shown via the display 420 may include the image data of the items 450 with one or more display features 451 selected for only a portion of the items 450 on the conveying mechanism 400. For example, the display 420 may be configured to present display features 451 for only those items 450 originating from a particular source (e.g., a specified additional conveying mechanism).

The display 420 may be configured to present the image data with the one or more associated display features 451 in coordination with the controller system 100 selecting a display feature 451 for an item 450, or it may be synchronized with the movement of the conveying mechanism 400 such that the displayed portion of the image data (e.g., video segment) corresponds to the items 450 moving through the work zone 405. In various embodiments in which items 450 travelling with the conveying mechanism 400 enter the acquisition zone 401 prior to entering the work zone 405, the controller system 100 and/or display 420 may delay presenting the captured image data for a period of time in order to synchronize the displayed image data with the conveyor mechanism 400. For example, the display 420 may be configured to present the portion of the image data in which the leading edge (e.g., downstream edge) of an item 450 crosses the upstream edge 402 of the acquisition zone 401 at substantially the same time that the leading edge of the item crosses the upstream edge 406 of the work zone 405. The display 420 may continue to present the portion of the image data (e.g., video segment) corresponding to the item 450 for at least as long as the item 450 is located within the work zone 405. Because a user may remove an item 450 from the work zone 405 before the item 450 travels with the conveying mechanism 400 out of the work zone 405, the display 420 may be configured to display the portion of the image data corresponding to the item 450 for the amount of time that it would take the item 450 to traverse the work zone 405 if it remains on the conveying mechanism 400.

In various embodiments, the controller system 100 and/or display 420 may incorporate the display features 451 into the image data such that each display feature 451 appears on or near the image of the item 450 to which it is associated (Block 507 of FIG. 5). In various embodiments, the display features 451 may be superimposed onto the image data of the corresponding items 450 such that the display features 451 appear at least partially on the corresponding item 450. Alternatively, the display features 451 may appear substantially adjacent to the corresponding item 450, such that a user may determine that a particular display feature 451 is associated with a particular item 450 based on the proximity of the display feature 451 to an image of an item 450.

In certain embodiments, the controller system 100 and/or the display 420 may be configured to receive timing data for determining an optimal time to present the captured image data with incorporated display features 451 (Block 508A of FIG. 5). Such timing data may include information regarding the location of the work zone 405 in relation to the acquisition zone 401 and a speed at which the conveying mechanism 400 or the one or more items 450 is moving (also referred to herein as speed data). The relationship between the location of the work zone 405 and the location of the acquisition zone 401 may be expressed as the distance, measured along the conveying mechanism 400 travel path, between an upstream edge 402 of the acquisition zone 401 and an upstream edge 406 of a work zone 405, denoted as the distance b in FIG. 4. As shown in FIG. 4, the upstream edge 402 of the acquisition zone 401 and upstream edge 406 of the work zone 405 may be the edge an item crosses as it enters each zone 401, 405 while travelling with the conveying mechanism 400, respectively. As will be understood by those skilled in the art, the relationship between the work zone 405 and the acquisition zone 401 may be expressed in terms of a distance along the conveying mechanism 400 travel path between any point in the work zone 405 and a corresponding point in the acquisition zone 401 (e.g., between the center points of each zone, the downstream edges of each zone, or similar). Alternatively, the controller system 100 and/or display 420 may receive information regarding the current location of each item 450, such that the controller system 100 and/or display 420 can determine when at least a portion of an item 450 enters the work zone 405.

As described above, the display 420 may additionally be configured to present display features 451 or other visual features comprising general information. In various embodiments, such display features 451 or other visual features may appear superimposed over areas of the conveying mechanism 400 in which no items 450 are located. As will be understood by one skilled in the art, the display 420 may be configured to present the image data comprising areas of the conveying mechanism 400 with corresponding display features 451 or other visual features comprising general information in a manner similar to that described above for displaying image data comprising items 450 and corresponding display features 451. For example, the display 420 may be configured to present the image data comprising areas of the conveying mechanism 400 and associated display features 451 or other visual features comprising general information at the same time that the areas of the conveying mechanism 400 are within the work zone 405.

In various embodiments, the configuration of the work zone 405 may be defined by a user prior to operation of the acquisition/display entity 115. The configuration of the work zone 405 may comprise characteristics of the work zone 405 such as its size, orientation, shape, location, and/or the like. The configuration of the work zone 405 may additionally comprise the location of the upstream edge 406 of the work zone 405. In various embodiments, the controller system 100 and/or display 420 may receive user input defining the configuration of the work zone 405 and may be configured to determine an optimal time to present the captured image data with incorporated display features 451 via the display 420, based at least in part on the configuration of the work zone 405. For example, the controller system 100 and/or display 420 may be configured to calculate the distance b based on the defined configuration of the work zone 405, and may determine an appropriate delay based on the calculated distance b and the speed of the conveying mechanism 400.

The controller system 100 and/or display 420 may be configured to automatically define at least a portion of the configuration of work zone 405 based at least in part on the location of a user (e.g., personnel sorting items). In various embodiments, the controller system 100 and/or display 420 may be configured to receive location data comprising the location of a user from a user device 110 located on or near the user, and may define the configuration of the work zone 405 based on this received location. For example, the controller system 100 and/or display 420 may receive location data from a user device 110 comprising the location of a user, and may automatically define the location and orientation of the work zone 405 such that it is located on the conveyor 400 near the user's location. The controller system 100 and/or display 420 may be configured to define the configuration of the work zone 405 prior to operation of the acquisition/display entity 115. The controller system 100 and/or display 420 may be configured to update the configuration of the work zone 405 based on the location of a user at one or more times during operation of the acquisition/display entity 115. For example, if the user moves to a new location, the controller system 100 and/or display 420 may be configured to redefine the location of the work zone 405. As described above, the controller system 100 and/or display 420 may be configured to determine an optimal time to present the captured image data with incorporated display features 451 via the display 420, based at least in part on the automatically defined configuration of the work zone 405.

The controller system 100 and/or display 420 may be configured to receive the speed data prior to operation of the acquisition/display entity 115. In various embodiments, the controller system 100 and/or display 420 may be configured to receive speed data at one or more times during operation of the acquisition/display entity 115. The speed data may be received as a value entered as user input, or it may be received from a device configured to determine the speed of the conveying mechanism 400.

By utilizing the information regarding the distance an item 450 must travel after its identity and location are captured but before it enters the work zone 405 and the speed at which each item 450 is moving on the conveying mechanism 400, the controller system 100 may determine the amount of time required for an item 450 to travel from a point in the acquisition zone 401 to a corresponding point in the work zone 405 (Block 508B in FIG. 5). The controller system 100 and/or display 420 may then wait this elapsed time (also referred to herein as delay time) prior to displaying the captured image data such that image data of each item 450 with associated display features 451 appears on the display 420 at the same time that the corresponding item 450 enters the work zone. The controller system 100 and/or display 420 may be configured to calculate the delay time prior to the operation of the acquisition/display entity 115. In various embodiments, the controller system 100 and/or display 420 may be configured to calculate the delay time at one or more times during operation of the display/acquisition device. For example, the controller system 100 and/or display 420 may calculate the delay time each time the configuration of the work zone 405 changes and/or each time the speed data changes. In various embodiments, the display 420 may be configured to update the currently presented image data after (e.g., in response to) the controller system 100 and/or display 420 calculates the delay time.

FIGS. 6a and 6b, and FIGS. 7a and 7b show exemplary schematics showing a work zone 405 and a display 420 at particular points in time. As shown in FIG. 6a, the work zone 405 contains four items 450 moving along the conveying mechanism 400 with a certain orientation. At the same time, the display 420 may be configured to present captured image data (e.g., video) containing representations of the same four items 450 with corresponding display features 451 as shown in FIG. 6b. FIG. 7a shows a second exemplary schematic of a work zone 405; however as shown in FIG. 7a, only one item 450 is completely within the work zone 405 and two items 450 are partially within the work zone 405. The corresponding display 420, shown in FIG. 7b, presents captured image data of the one full item and two partial items corresponding to each of the items 450 at least partially within the work zone 405 and corresponding display features 451 located on or near each object 450a. Alternatively, the controller system 100 and/or display 420 may incorporate a predetermined delay (e.g., 20 seconds), prior to presenting the image data (e.g., video) via the display 420 (Block 508C of FIG. 5). The display tasks end at Block 509 when the display 420 presents the image data (e.g., video) with incorporated display features 451.

In various embodiments comprising one or more additional acquisition devices and/or displays, each of the acquisition devices and/or displays may be in communication with the controller system 100 or with different controller systems. Each of the additional acquisition devices and/or displays may be configured to operate in substantially the same manner as described above in regards to acquisition device 410 and display 420. Alternatively, one or more additional acquisition devices may be configured to capture only a subset of the data captured by the acquisition device 410, and the controller system 100 and/or one or more additional acquisition devices may be configured to associate the previously collected information/data with the items 450 passing through the one or more additional acquisition zones. For example, the one or more additional acquisition devices may be configured to capture image data and determine the location of each item 450, but may not be configured to read item identifiers associated with each item 450. In such configurations, the controller system 100 and/or one of the displays may be configured to associate a previously read item identifier with the items 450 represented in the image data captured by the one or more additional acquisition devices based on the information/data captured by the one or more additional acquisition devices.

The acquisition/display entity 115 may comprise one or more additional displays. As previously described, such displays may have a configuration substantially similar to that of the display 420. For example, the one or more additional displays may be configured to display the image data captured by the acquisition device 410 or an additional acquisition device. In various embodiments, the one or more additional displays may be associated with one or more additional work zones, such that the one or more additional displays are visible to a user located near the one or more additional work zones (e.g., personnel sorting items). In various embodiments, the controller 100 and/or one or more additional displays may be configured to calculate one or more additional delay times for determining an optimal time to present the captured image data via the one or more additional displays using those steps described above in regards to calculating a delay time for presenting image data via display 420. For example, in embodiments comprising one or more additional acquisition devices capturing image data from one or more additional acquisition zones, the controller system 100 and/or one or more additional displays may be configured to calculate one or more additional delay times based at least in part on the speed data and the distance between a point in the one or more additional work zones and a corresponding point in the one or more additional acquisition zones, measured along the conveying mechanism 400 travel path. As an additional example, in embodiments comprising only the acquisition device 410 capturing image data from the acquisition zone 401, the controller system 100 and/or one or more additional displays may be configured to calculate one or more additional delay times based at least in part on the speed data and the distance between a point in the one or more additional work zones and a corresponding point in the acquisition zone 401.

In various embodiments, the controller system 100 may be in communication with one or more user devices 110 that may receive information contained in a display feature 451 from the controller system 100 and communicate the information contained in the display feature 451 to a user. For example, the controller system 100 may be in communication with a wearable user device 110 that includes a display and a scanner. A user of the wearable user device 110 may read, scan, or otherwise obtain an item identifier using the user device 110. The user device 110 may then transmit the item identifier to the controller system 100 or another appropriate computing entity, which is configured to determine appropriate display features 451 for each item identifier. The determined display features 451 associated with the scanned item identifier may then be transmitted to the user device 110 and presented via a display screen in communication with the user device 110. In various embodiments, the controller system 100 may be configured to communicate the image data (e.g., video) with the associated display features 451 to the additional user device 110, although the controller system 100 may also be configured to send only the information associated with the display features 451 to the user device 110. For example, a user may scan an item identifier using the user device 110 after removing an item 450 from the conveying mechanism 400 and walking into a delivery vehicle. The user device 110 may obtain the information contained in the relevant display features 451 and may present the information to the user as a reminder when the user is unable to see the display 420.

As will be understood by one skilled in the art, the user device 110 may be configured to receive an item identifier by manual entry of the item identifier. For example, the user device 110 may include an input device allowing users to manually enter information into the user device 110. In addition, the user device 110 may be configured to determine appropriate display features 451 or other information (e.g., sort instructions) for a particular item based on the received item identifier. The user device 110 may also be configured to receive additional information related to a scanned item identifier not otherwise contained in a display feature 451. In various embodiments, the user device 110 may be configured to receive and present more detailed information regarding a particular item 450 than otherwise included in the display features 451 presented via the display 420.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising an acquisition device, a controller system, and a display device for displaying information about one or more items moving along a path, the system configured to:
   capture image data of an item moving along a path while the item is located within an acquisition zone located along the path;
   capture an item identifier for the item;
   identify one or more display features based at least in part on the item identifier; and
   cause display of at least a portion of the image data of the item and the one or more display features after a predefined time delay after the portion of the image data is captured, wherein the predefined time delay is determined based at least in part on a distance between a point in the acquisition zone and a corresponding point in a work zone spaced a distance away from the acquisition zone and the speed at which the items are moving along the path, such that the portion of the image data is displayed while the item is located in the work zone.

2. The system of claim 1, wherein the item identifier is selected from the group consisting of an optical code, a barcode, a QR code, an RFID tag, or a character string.

3. The system of claim 1 further configured to determine a location of the item.

4. The system of claim 1 further configured to determine a location of the item at multiple instances in time while the item is located in the acquisition zone.

5. The system of claim 3, wherein the one or more display features are associated with the determined location of the item, and the display is configured to present the image data with the one or more display features located on or near the determined location of the item in the image data.

6. The system of claim 1, wherein the controller is configured to receive a value representing the time delay.

7. The system of claim 1, wherein the one or more display features comprise at least one handling instruction.

8. A method of displaying information about one or more items moving along a path comprising the following steps:
   (1) capturing image data of an item moving along a path while the item is located within an acquisition zone located along the path;
   (2) receiving an item identifier for the item;
   (3) identifying one or more display features based at least in part on the item identifier;
   (4) associating the one or more display features with the item identifier and the image data; and
   (5) displaying the image data and the one or more display features after a predefined time delay after capturing the image data, wherein the predefined time delay is determined based at least in part on a distance between a point in the acquisition zone and a corresponding point in a work zone spaced a distance away from the acquisition zone and the speed at which the items are moving along the path, such that the portion of the image data is displayed while the item is located in the work zone.

9. The method of claim 8, wherein the item identifier is selected from the group consisting of an optical code, a barcode, a QR code, an RFID tag, or a character string.

10. The method of claim 8, additionally comprising the step of determining a location of the item.

11. The method of claim 8, additionally comprising the step of determining a location of the item at multiple instances in time.

12. The method of claim 10, additionally comprising the step of associating the one or more display features with the determined location of the item, and presenting the image data with the one or more display features located on or near the determined location of the item in the image data.

13. The method of claim 8, additionally comprising the step of receiving a value representing the time delay prior to displaying the image data and associated display features.

14. The method of claim 8, wherein the display features comprise at least one handling instruction.

15. A computer program product for displaying information regarding an item travelling along a path, the computer program product comprising at least one non-transitory computer-readable storage medium having computer-readable program code portions stored therein, the computer-readable program code portions comprising:
   an executable portion configured to receive image data of an item moving along a path while the item is located within an acquisition zone located along the path;
   an executable portion configured to receive an item identifier for the item;
   an executable portion configured to identify one or more display features based at least in part on the item identifier;
   an executable portion configured to associate the one or more display features with the item identifier and the image data; and
   an executable portion configured to display the image data and one or more display features after a predefined time delay after receiving the image data wherein the predefined time delay is determined based at least in part on a distance between a point in the acquisition zone and a corresponding point in a work zone spaced a distance away from the acquisition zone and the speed at which the items are moving along the path, such that the portion of the image data is displayed while the item is located in the work zone.

16. The computer program product of claim 15, wherein the item identifier is selected from the group consisting of an optical code, a barcode, a QR code, an RFID tag, or a character string.

17. The computer program product of claim 15, additionally comprising an executable portion for determining a location of the item.

18. The computer program product of claim 15, additionally comprising an executable portion for determining a location of the item at multiple instances in time.

19. The computer program product of claim 17, additionally comprising an executable portion for associating the one or more display features with the determined location of the item and displaying the image data with the one or more display features located on or near the determined location of the item in the image data.

20. The computer program product of claim 15, additionally comprising an executable portion configured to receive a value representing the time delay to wait prior to displaying the image data and the one or more display features.

21. The computer program product of claim 15, wherein the display features comprise at least one handling instruction.

\* \* \* \* \*